United States Patent
Shampine et al.

(10) Patent No.: US 10,047,601 B2
(45) Date of Patent: Aug. 14, 2018

(54) MOVING SYSTEM

(71) Applicant: SCHLUMBERGER TECHNOLOGY CORPORATION, Sugar Land, TX (US)

(72) Inventors: Rod William Shampine, Houston, TX (US); Andrey Bogdan, Sugar Land, TX (US); Adam Keilers, Richmond, TX (US); Bruno Lecerf, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 112 days.

(21) Appl. No.: 14/939,876

(22) Filed: Nov. 12, 2015

(65) Prior Publication Data
US 2017/0138178 A1    May 18, 2017

(51) Int. Cl.
| G01V 1/133 | (2006.01) |
| E21B 47/09 | (2012.01) |
| E21B 17/20 | (2006.01) |
| E21B 43/26 | (2006.01) |
| E21B 33/12 | (2006.01) |
| E21B 34/06 | (2006.01) |
| G01V 1/52  | (2006.01) |

(52) U.S. Cl.
CPC ............ *E21B 47/091* (2013.01); *E21B 17/20* (2013.01); *E21B 43/26* (2013.01); *E21B 33/12* (2013.01); *E21B 34/06* (2013.01); *G01V 1/52* (2013.01)

(58) Field of Classification Search
CPC ........ E21B 47/091; E21B 17/20; E21B 43/26; E21B 33/12; E21B 34/06; E21B 47/101; E21B 47/0005; G01V 1/137; G01V 1/44; G01V 2210/1212; G01V 2210/1299; G01V 1/52

USPC .................................................... 367/25, 143
See application file for complete search history.

(56) References Cited

U.S. PATENT DOCUMENTS

| 5,093,811 A   | 3/1992  | Mellor et al. |
| 5,206,836 A   | 4/1993  | Holzhausen et al. |
| 5,285,388 A * | 2/1994  | McCoy ................. E21B 47/042 367/113 |
| 5,361,837 A   | 11/1994 | Winbow |
| 6,192,316 B1  | 2/2001  | Hornby |
| 6,970,398 B2  | 11/2005 | Lavrut et al. |

(Continued)

FOREIGN PATENT DOCUMENTS

WO    WO 2015099663 A1 *    7/2015    ............. E21B 47/04

OTHER PUBLICATIONS

Autocorrelation, Wikipedia, 2017, downloaded Apr. 30, 2017 from https://en.wikipedia.org/wiki/Autocorrelation, 10 pages.*

(Continued)

*Primary Examiner* — Daniel L Murphy
(74) *Attorney, Agent, or Firm* — Andrea E. Tran

(57) ABSTRACT

A method moves a tube wave reflector in a well, generates a tube wave, receives a reflection, and determines the depth of one or more reflector locations from the elapsed time. Also, a method to locate a feature in a well deploys a bottom hole assembly (BHA), generates acoustic noise from the BHA, and autocorrelates to determine the BHA depth. Also, a system has a coiled tubing string to a BHA, a surface wave generator, a surface and/or distributed receiver, and a recorder to determine elapsed times between generation and receipt.

27 Claims, 10 Drawing Sheets

(56) References Cited

U.S. PATENT DOCUMENTS

| | | |
|---|---|---|
| 7,552,761 B2 | 6/2009 | Moriarty |
| 7,617,873 B2 | 11/2009 | Lovell et al. |
| 7,819,188 B2 | 10/2010 | Auzerais et al. |
| 9,057,232 B2 | 6/2015 | Cioanta et al. |
| 2006/0293857 A1 | 12/2006 | Moos et al. |
| 2008/0239872 A1 | 10/2008 | Miller et al. |
| 2011/0267922 A1 | 11/2011 | Shampine et al. |
| 2012/0018150 A1 | 1/2012 | Shampine et al. |
| 2013/0154846 A1 | 6/2013 | Mangione et al. |

OTHER PUBLICATIONS

International Search Report and Written Opinion issued in International Patent Appl. No. PCT/US2016/061217 dated Mar. 6, 2017; 21 pages.

\* cited by examiner

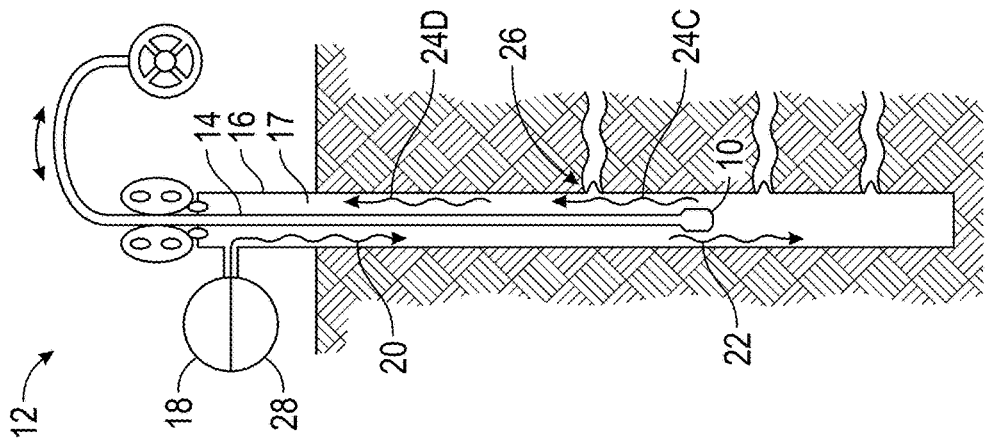
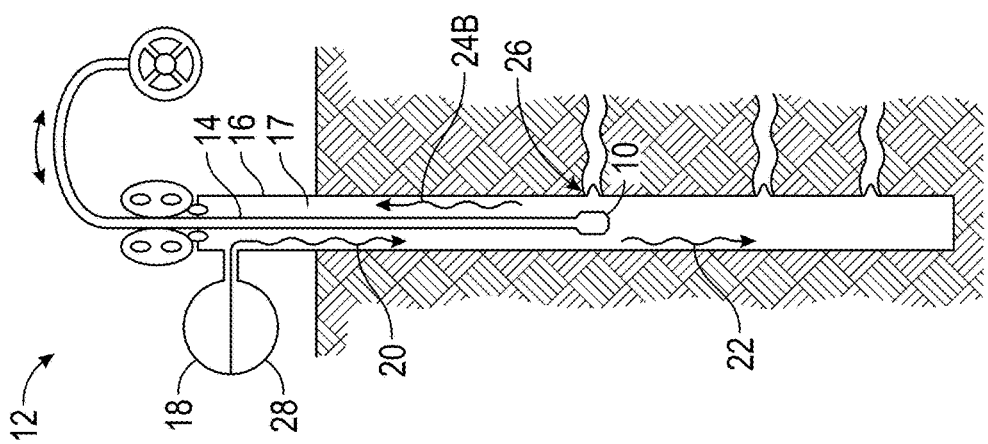
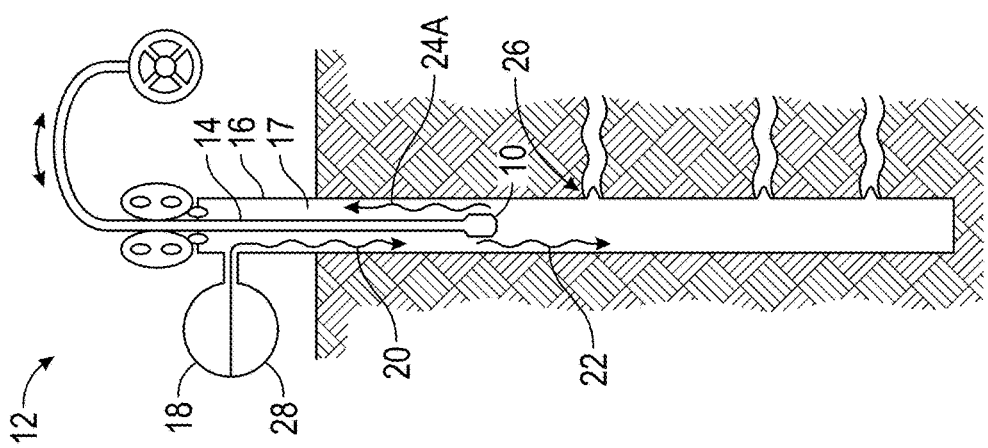

MOVING SYSTEM

CROSS REFERENCE TO RELATED APPLICATION(S)

None.

BACKGROUND

It is commonly known the fluid flow through perforations into a formation during a fracturing operation is not uniform. It is also well known that the resulting production is likewise extremely non-uniform, with a small fraction of the perforations producing the bulk of the production from the well. Efforts are ongoing to use targeted fracturing techniques to improve this situation by limiting the entry of fracturing fluid to specific locations in the well. However, a large number of wells already exist with poor distribution, and it may not be economically feasible to "refracture" such wells in a uniform manner.

Existing methods to measure the non-uniformity of production, and determine the distribution or map of relative producibility, include downhole flow measurement devices that can be positioned and used at multiple locations in the well, and straddle packer systems to produce a map from a specific area. Flow metering systems can be used to quantify how the total production flow of a well collects as the flow passes various perforations. This system is limited by the time required to get good quality data, the effect of the conveyance means on the well, and the resolution of the number of positions where data is collected. Straddle packer systems can be used to isolate a specific area in the well and produce it across a range of flow rates, yielding detailed information on this area. However, this means that at least part of the well has to be taken off of production, and the packer system and its conveyance is relatively slow and expensive to use.

The analysis of reflected pressure or tube waves has been used to detect a fracture or bottom irregularity in a well. Several references describe ways to analyze tube wave reflections, such as US 2011/0267922, US 2012/0018150, U.S. 61/923,216, and U.S. Pat. No. 7,819,188.

Additionally, the current state of the art for tracking the end of coiled tubing is measuring the length of coiled tubing deployed and using a tubing end locator, i.e., a set of sensors and physical down hole objects, such as a casing collar for ACTIVE™ coil that interacts with the coil to obtain a good reference position. Also, physical completion objects placed in the well that the coil can pull or push on help indicate its current depth. These tubing end locators have complicated issues associated with them, however, and do not always lead to a realistic depth measurement.

In the usual conditions, such tubing end locators can provide a good position reference accurate to about 3 m (10 ft) when the coiled tubing is being deployed down hole; however, this reference can become inaccurate when the coiled tubing motion is reversed. The calculation of the end of coil in vertical wells is easier because the tension on the coil is known, but the temperature in the wellbore can cause the coil to lengthen and/or balloon and introduce some inaccuracy. In horizontal wells, the end of coiled tubing does not move immediately when pulled on since it must overcome any helical or sinusoidal buckling before the end starts to move.

The industry has ongoing requirements for the development or improvement of methods, systems, and tools to determine the location and/or status of tools, fracture zones before, during, and/or after fracturing or refracturing operations, and/or such methods, systems, and tools that can be used in wells with or expected to have multiple open fracture zones.

SUMMARY OF DISCLOSURE

In one aspect, embodiments of the present disclosure relate to methods, systems, and/or tools for the location of tools and/or features in a well using tube waves, which are also referred to herein as pressure waves, reflected from a tube wave reflector in the well, receiving a reflection of the tube wave from the reflector, e.g., with the receiver in a fixed location and or the tube wave generator at either a fixed absolute location or a fixed location relative to the reflector, and determining the depth of the reflector based on the time between the tube wave generation and reflection. In some embodiments, this information may be used to assess the effectiveness of wellbore changes by interrogating before, during, and/or after well servicing operations such as, for example, fracturing, zonal isolation, cementing, acidizing, sleeve shifting, and so on. In some embodiments, in the case of a producing well the tube wave reflector can be deployed and/or interrogated while maintaining production from the well.

In some embodiments, when a tube wave is reflected from an interface or change in the tubular media, the resulting wave is related to the original wave, but modified by the character of the reflector. In some embodiments, a reflector, which may comprise a reflective tool on the end of a wireline, coiled tubing, or other conveyance, is located at an area of interest in the well and/or within a pulse length of it, and is interrogated with a tube wave signal. In some embodiments, the top of the tool acts as a strong reflector, but the character of the reflection depends on geometry of the well, the tool, and the characteristics of the well, e.g., a reflection that is the same sign as the interrogation signal may imply that the wellbore is substantially solid, whereas an inverted reflection may imply that there is a flowing fluid passage adjacent to the reflector, which can be a perforation or similar feature in the well bore.

In some embodiments of this disclosure, a method comprises: (a) deploying a moveable tube wave reflector to a first location in the well; (b) generating a tube wave in the well; (c) receiving a reflection of the tube wave from the reflector; (d) determining the depth of the reflector based on the time between the tube wave generation and receipt of the reflection; (e) moving the reflector to a second location in the well; and (f) after moving the reflector, repeating the tube wave generation (b), the reflection receipt (c), and the determination of the depth of the reflector (d).

In some embodiments of this disclosure, there is provided another method that can be used, for example, to locate a feature in a well comprising a wellbore, a coiled tubing string connected to a bottom hole assembly, an annulus in an upper section of the well above the bottom hole assembly, and a lower section of the well between the end of the coiled tubing and a downhole reference. The method comprises (a) deploying the bottom hole assembly to a first location in the well; (b) generating a tube wave in the well from a surface wave generator; (c) receiving a reflection of the tube wave from the bottom hole assembly; (d) determining the depth of the bottom hole assembly based on the time between the tube wave generation and receipt of the bottom hole assembly reflection; (e) moving the bottom hole assembly to a second location in the well; and (f) after moving the bottom hole assembly, repeating the tube wave generation (b), the reflection receipt (c), and the determination of the depth of the bottom hole assembly (d).

In some embodiments of this disclosure, a method is used, for example, to locate a feature in a well comprising a wellbore, a coiled tubing string connected to a bottom hole assembly, an annulus in an upper section of the well above the bottom hole assembly, and a lower section of the well between the end of the coiled tubing and a downhole reference. The method comprises deploying the bottom hole assembly to a location in the well; generating acoustic noise from the bottom hole assembly to initiate tube waves in the annulus, e.g., wherein the bottom hole assembly comprises a nozzle that emits noise when a fluid is pumped out of the tubing string into the well bore; receiving the tube waves at a surface receiver in the annulus; autocorrelating the acoustic noise and the tube waves received to determine the elapsed time between the generation of the noise and the receipt of the waves; and determining the depth of the bottom hole assembly based on the elapsed time.

In some embodiments of this disclosure, a system to determine the depth of a bottom hole assembly in a well comprises a coiled tubing string extending from the surface and connected to the bottom hole assembly; a wave generator located at or near the surface to generate a tube wave in the well; at least one coiled tubing receiver located in the coiled tubing string to receive reflections of the tube wave, the at least one coiled tubing receiver selected from a surface receiver, a distributed sensor cable, or a combination thereof; at least one annulus receiver located in the annulus between the wellbore and the coiled tubing string to receive reflections of the tube wave, the at least one annulus receiver selected from a surface receiver, a distributed sensor cable, or a combination thereof; and a recorder to determine elapsed times between the tube wave generation and the receipt of the reflections thereof.

Other aspects and advantages of the disclosure will be apparent from the following description and the appended claims.

BRIEF DESCRIPTION OF DRAWINGS

FIG. 1A is a schematic diagram of a reflector tool in a well in accordance with some embodiments of the present disclosure.

FIG. 1B is a schematic diagram of the reflector tool of FIG. 1A shown in another position in the well, in accordance with embodiments of the present disclosure.

FIG. 1C is a schematic diagram of the reflector tool of FIGS. 1A and 1B shown in another position in the well, in accordance with embodiments of the present disclosure.

GLOSSARY

Figure 2A:
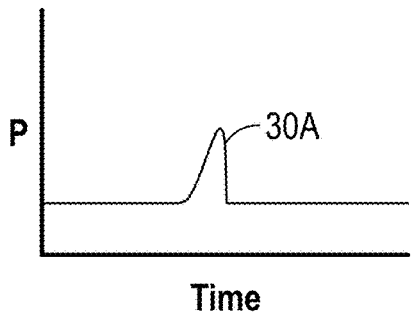
FIG. 2A is a qualitative pressure wave trace diagram from the sensor of FIG. 1A or 1C, in accordance with some embodiments of the disclosure.

"Above", "upper", "heel" and like terms in reference to a well, wellbore, tool, formation, refer to the relative direction or location near or going toward or on the surface side of the device, item, flow or other reference point, whereas "below", "lower", "toe" and like terms, refer to the relative direction or location near or going toward or on the bottom hole side of the device, item, flow or other reference point, regardless of the actual physical orientation of the well or wellbore, e.g., in vertical, horizontal, downwardly and/or upwardly sloped sections thereof.

Adapted to—made suitable for a use or purpose; modified.

Adjacent—at or near; next to.

Analyze—to study closely and carefully.

Annulus—a ring-like figure, structure, part, marking, area or region, such as the space between the inside surface of a large pipe and the outside surface of smaller tubing or pipe within the large pipe.

Borehole or wellbore—the portion of the well extending from the Earth's surface formed by or as if by drilling, i.e., the wellbore itself, including the cased and openhole or uncased portions of the well.

Carrying—adapted to move while supporting.

Casing/casing string—large-diameter pipe lowered into an open hole and cemented in place.

Cluster—a collection of data points with similar characteristics.

Coiled tubing/tubing string—a well operation or system employing a long continuous length of pipe wound and unwound from a spool to lower and raise downhole tools; the continuous length of pipe used in such operations.

Confirm—to make sure or demonstrate that something is true, accurate, or justified; verify; substantiate.

Deconvoluting—algorithmic processing to reverse the effects of convolution on recorded data.

Degradable—a material capable of breaking down, or chemically deteriorating, or changing state as by dissolution, sublimation or melting.

Degradation conditions—conditions at which the process of degrading a degradable material can initiate or continue.

As used herein, a degradable diverter placed in a flow passage has "substantially degraded" when the process of degrading has progressed to the point where fluid can readily pass through the flow path.

Depth—includes horizontal/lateral distance/displacement.

Derived (data)—obtained from a specified source. For the avoidance of doubt, data derived from a specified source may comprise or consist of the original data per se.

Determine—to establish or ascertain definitely, as after consideration, investigation, or calculation.

Diversion—the act of causing something to turn or flow in a different direction.

Diversion material—a substance or agent used to achieve diversion during stimulation or similar injection treatment; a chemical diverter.

Diversion pill—a relatively small quantity of a special treatment fluid blend used to direct or divert the flow of a treatment fluid.

Divert—to cause something to turn or flow in a different direction.

Diverter—anything used in a well to cause something to turn or flow in a different direction, e.g., a diversion material or mechanical device; a solid or fluid that may plug or fill, either partially or fully, a portion of a subterranean formation.

Each—used to refer to every one of two or more things, regarded and identified separately.

Embodiments—non-limiting tangible or visible forms of an idea or quality according to the present disclosure.

"Emission location" as used herein refers to the point of origin or entry of a wave into the fluid in the main wellbore passage or annulus interfacing the casing or interior surface of the wellbore in an open completion, e.g., the transducer of a downhole emitter locally coupled to the wellbore fluid, the end or other opening of a coiled tubing that conducts a pressure wave via a fluid filling the coiled tubing from a remote pressure wave generator, etc. For purposes of the present disclosure and claims, an emitter is deemed to be in the well at the emission location even if the tube wave generation originates from a device located wholly or partially outside the wellbore.

Emit—to send out from a source.

Emitter—a device that emits something, sometimes referred to as downhole source.

Feature—a distinctive attribute or aspect of something.

Fixed—predetermined and not subject to change.

Flow path—a passageway, conduit, porous material or the like through which fluid may pass.

Fluid communication—connection via a flow path.

Fluid hammer—a pressure surge or wave caused when a fluid in motion is suddenly forced to stop or change direction.

Formation—a body of rock that is sufficiently distinctive and continuous that it can be mapped, or more generally, the rock around a borehole.

Fracture—a crack or surface of breakage within rock.

Fracture zone—an interval having one or more fractures treated concurrently, e.g., fractures associated with a perforation cluster and/or treated in the same stage.

Hydraulic fracturing or "fracturing"—a stimulation treatment involving pumping a treatment fluid at high pressure into a well to cause a fracture to open.

Initiate—to cause a process or action to begin.

Injection—pumping fluid through the wellbore into the reservoir for storage or to maintain pressure and/or in a flooding operation.

Instantaneous shut-in pressure or ISIP—the shut-in pressure immediately following the cessation of the pumping of a fluid into a well.

Interval—a space between two points or times, e.g., the space between two points in a well.

Lateral—a branch of a well radiating from the main borehole.

Liner—a casing string that does not extend to the top of the wellbore, but instead is anchored or suspended from inside the bottom of the previous casing string.

Map—make a diagrammatic representation of an area or region indicating physical features.

Measure—to ascertain the value, number, quantity, extent, size, amount, degree, or other property of something by using an instrument or device.

Modify—to make partial or minor changes to (something), typically so as to improve it or to make it less extreme.

Monitor—to observe, record or detect the progress or quality of something over a period of time; keep under systematic review for purposes of control or surveillance.

Overlapping—partly coinciding in time or spatial dimension(s).

Perforation—the communication tunnel created from the casing or liner into the reservoir formation, through which fluids may flow, e.g., for stimulation and/or oil or gas production.

Perforation cluster—a group of nearby perforations having similar characteristics.

Pill—any relatively small quantity of a special blend of drilling or treatment fluid to accomplish a specific task that the regular drilling or treatment fluid cannot perform.

Pressure signal emitter—a non-pumping device specially adapted to form a pressure wave in a wellbore, usually in communication with the high pressure side (outlet or discharge) of a fluid pump.

Progression—a movement or development toward a destination or a more advanced state, especially gradually or in stages; a succession; a series.

Proppant—particles mixed with treatment fluid to hold fractures open after a hydraulic fracturing treatment.

Proppant pumping schedule—a pumping sequence comprising the volume, rate, and composition and concentration of a proppant-laden fluid, and any associated treatment fluids such as an optional pad, optional spacers, and an optional flush.

Receive—to convert a signal to a file, sound, visual display or other perceptible medium.

Receiver—an electrical or computer apparatus that converts a signal to a file, sound, visual display or other perceptible medium.

"Receiving location" as used herein refers to the point in the wellbore fluid from whence the signal is received, e.g., at the transducer of a downhole receiver where it is coupled to the wellbore fluid. For purposes herein a distributed sensor cable is considered to provide a receiving location at all points along the extent of the cable capable of sensing a signal.

Reference, downhole—the lowermost plug or end of a wellbore from which substantially all of a tube wave is reflected, e.g. a bridge plug or the bottom of the wellbore.

Refracturing or refrac—fracturing a portion of a previously fractured well after an initial period of production. The fractures from the earlier treatment are called "pre-existing fractures".

Reflector—an object or device that reflects radio waves, seismic vibrations, sound, or other waves Regularly changing frequency—a frequency (cycles per time) that varies in an ordered pattern.

Remote—distant or far away.

Reservoir—a subsurface body of rock having sufficient porosity and permeability to store and transmit fluids.

Respective—belonging or relating separately to each of two or more things.

Response—the reaction resulting from a stimulus.

Re-stimulation—stimulation treatment of any portion of a well, including any lateral, which has previously been stimulated.

Revise—alter in light of developments.

Sending—cause (a message or computer file) to be transmitted electronically.

Sensing—automatically detecting or measuring something.

Sensor—a device that detects or measures a physical property and records, indicates or otherwise responds to it.

Shut in—closing a wellbore at the surface, e.g., at or near the Christmas tree, blowout preventer stack Shut-in pressure or SIP—the surface force per unit area exerted at the top of a wellbore when it is closed, e.g., at the Christmas tree or BOP stack.

As used herein, "sign" refers to the mathematical character of a number or the direction of a wave, viz. whether positive (greater than zero or the same direction as a reference) or negative (less than zero or a different direction with respect to a reference).

Signal—an acoustic, physical, chemical, electrical, electromagnetic, or other impulse transmitted or received.

Simulate—to create a representation or model of something, e.g., a physical system or particular situation.

Stage—a pumping sequence comprising a proppant pumping schedule and a diversion pill pumping schedule, including pads, spacers, flushes and associated treatment fluids.

Stimulation—treatment of a well to enhance production of oil or gas, e.g., fracturing, acidizing, and so on.

Surface—the surface of the Earth.

Surface (thing)—something positioned or performed at the surface of the Earth.

Sweep circuit—an electronic or mechanical device which creates a waveform with a regularly changing frequency or amplitude, usually a linearly varying frequency and a constant amplitude.

Tandem—having two things arranged one in front of the other.

Tractor—a powered vehicle with wheels or treads used to haul or move equipment.

Treatment—the act of applying a process or substance to something to give it particular properties.

Treatment fluid—a fluid designed and prepared to resolve a specific wellbore or reservoir condition.

Tube wave—a periodic pressure disturbance in which alternating compression and rarefaction are propagated through or on the surface of a medium without translation of the material; also known as a pressure wave or Stoneley wave.

Well—a deep hole or shaft sunk into the earth, e.g., to obtain water, oil, gas, or brine.

Wireline—a well operation or system employing single-strand or multi-strand wire or cable to lower and raise downhole tools; the wire or cable used in such operations.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible. At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Some embodiments of the present disclosure relate to methods, systems, and/or tools for the location of tools and/or features in a well using tube waves, which are also referred to herein as pressure waves, e.g., to identify open fracture zones in a well and determine the location at which they intercept the wellbore, before, during, and/or after a well treatment, e.g., a well stimulation operation such as a fracturing or refracturing treatment. In some embodiments, the tube wave is reflected from a reflector in the well, and the reflection is received at a receiver, e.g., with the receiver in a fixed location and or the tube wave generator at either a fixed location in such as the annulus or tubing, or a fixed location relative to the reflector. The depth of the reflector is determined from the elapsed time between the tube wave generation and reflection.

Where the reflector is part of or attached, for example, to a downhole tool, such as a downhole tool assembly, the depth of the reflector provides knowledge about the depth of the tool which may be used to ensure that the tool is at an appropriate depth before use, or provide a reference for the relative location of another tool, object, or wellbore feature having a fixed or known distance from the reflector.

When a tube wave reflects from an interface or change in the tubular media such as a fracture zone or other feature, the response is a reflection related to the original wave, but modified by the character of the reflector. In some embodiments, the character of the reflection can be analyzed to determine the nature of the wellbore adjacent the reflector, e.g., whether or not the reflector is near a particular type of feature, and or the properties of the feature. For example, the reflection may be of one sign (positive or negative) when the reflector is adjacent to a fracture, and of an opposite sign when it is not. Furthermore, when the sign is indicative of the presence of a fracture, the character of the reflection may also indicate the degree of conductivity of the fracture, e.g., a strong reflection may indicate a relatively higher conductivity than a weaker reflection.

In some embodiments, moving the reflector through a wellbore and taking readings at different locations can serve to map the fractures or other tube wave-responsive features in the wellbore along the entire wellbore or one or more intervals thereof, and or the relative conductivity of the fractures mapped. In the following discussion, reference is made to a fracture as an exemplary, non-limiting wellbore feature for the purpose of convenience and brevity, but the disclosure is also applicable to other types of wellbore features responsive to tube waves.

In some embodiments of this disclosure, a method comprises: (a) deploying a moveable tube wave reflector to a first location in the well; (b) generating a tube wave in the well; (c) receiving a reflection of the tube wave from the reflector; (d) determining the depth of the reflector based on the time between the tube wave generation and receipt of the reflection; (e) moving the reflector to a second location in the well; and (f) after moving the reflector, repeating the tube wave generation (b), the reflection receipt (c), and the determination of the depth of the reflector (d).

In some embodiments of the depth-determining method, the reflector comprises an interface between fluids of contrasting tube wave velocity. In some embodiments, the reflector comprises a reflective tool, which in some embodiments may be deployed on the end of a coiled tubing string. For example, the tool in some embodiments has an outside diameter equal to or greater than half that of the wellbore at the first and second locations, and/or a diameter larger than the coiled tubing.

In some embodiments of this depth-determining method, the method further comprises analyzing the sign of the reflection received relative to the tube wave generated to determine the presence or absence of a wellbore feature adjacent to the reflector; for example, a negative sign reflection received from a positive tube wave generation indicating the presence of a feature such as a fracture, a positive sign reflection indicating the absence of such a feature.

In some embodiments of this depth-determining method, the method further comprises analyzing the character of the reflection received to determine the presence or absence of an open fracture adjacent to the reflector by analyzing the sign of the reflection received relative to the tube wave generated, and or, if the fracture is present, to estimate the fluid conductivity of the fracture by analyzing the magnitude of the reflection received.

In some embodiments of this depth-determining method, the method comprises interrogating an interval of the well adjacent to the reflector with a pressure wave emitter at the location of the reflector to determine the spacing of a fracture in the interval relative to the reflector, and thus the depth of the fracture. In some embodiments, the interrogating pressure wave comprises the tube wave reflection; the interrogation comprises discharging an explosive, sparker, boomer, or a combination thereof; the interrogation comprises transmitting the pressure wave through a coiled tubing string in the well connected to the pressure wave emitter.

In some embodiments of this depth-determining method, the well is a producing well and the method comprises maintaining production during one or more or all of (a), (b), (c), (d), (e), and (f).

In some embodiments of this disclosure, there is provided another method that can be used, for example, to locate a feature in a well comprising a wellbore, a coiled tubing string connected to a bottom hole assembly, an annulus in an upper section of the well above the bottom hole assembly, and a lower section of the well between the end of the coiled tubing and a downhole reference. The method comprises (a) deploying the bottom hole assembly to a first location in the well; (b) generating a tube wave in the well from a surface wave generator; (c) receiving a reflection of the tube wave from the bottom hole assembly; (d) determining the depth of the bottom hole assembly based on the time between the tube wave generation and receipt of the bottom hole assembly reflection; (e) moving the bottom hole assembly to a second location in the well; and (f) after moving the bottom hole assembly, repeating the tube wave generation (b), the reflection receipt (c), and the determination of the depth of the bottom hole assembly (d).

In some embodiments of this feature-locating method, the method further comprises moving the bottom hole assembly in the well to one or more additional locations and repeating the tube wave generation (b), the reflection receipt (c), and the determination of the depth of the bottom hole assembly (d), at the one or more additional locations.

In some embodiments of this feature-locating method, the surface wave generator generates the tube wave into the annulus, the coiled tubing string, or a combination thereof. In some embodiments, the tube wave reflection from the bottom hole assembly is received with one or both of a surface receiver and a distributed sensor cable, which can be located in the annulus, in the coiled tubing string, or a combination thereof.

In some embodiments of this feature-locating method, the method further comprises: receiving a reflection of the tube wave from the downhole reference with one or both of a surface receiver and a distributed sensor cable; wherein one or more of the surface receivers, if present, are located in the annulus, in the coiled tubing string, or a combination thereof; wherein one or more of the distributed sensor cables, if present, are located in the annulus, in the coiled tubing string, or a combination thereof; and wherein the determination of the depth of the bottom hole assembly is based on a plurality of the times between the tube wave generation and the receipt of a like plurality of the reflections from the bottom hole assembly, the downhole reference, or a combination thereof.

In some embodiments of this feature-locating method, the method further comprises flowing fluid through the bottom hole assembly to open a check valve for fluid communication between the coiled tubing string and the wellbore, and permit passage of the tube waves and/or reflections between the coiled tubing string and the wellbore. In some embodiments, the interrogation comprises transmitting the pressure wave from the surface through the coiled tubing string to the bottom hole assembly. In some embodiments, the method further comprises receiving a reflection of the interrogating pressure wave from the fracture at a downhole receiver mounted (at an outside or inside surface) on the coiled tubing, e.g., at an outside or inside surface, and moveable in tandem with the bottom hole assembly; and or moving the bottom hole assembly in the well and repeating the interval interrogation at one or more additional locations.

In some embodiments of this feature-locating method, the well is a producing well and the method comprises maintaining production during one or more or all of (a), (b), (c), (d), (e), and (f).

In some embodiments of this disclosure, a method is used, for example, to locate a feature in a well comprising a wellbore, a coiled tubing string connected to a bottom hole assembly, an annulus in an upper section of the well above the bottom hole assembly, and a lower section of the well between the end of the coiled tubing and a downhole reference. The method comprises deploying the bottom hole assembly to a location in the well; generating acoustic noise from the bottom hole assembly to initiate tube waves in the annulus, e.g., wherein the bottom hole assembly comprises a nozzle that emits noise when a fluid is pumped out of the tubing string into the well bore; receiving the tube waves at a surface receiver in the annulus; autocorrelating the acoustic noise and the tube waves received to determine the elapsed time between the generation of the noise and the receipt of the waves; and determining the depth of the bottom hole assembly based on the elapsed time.

In some embodiments of this disclosure, a system to determine the depth of a bottom hole assembly in a well comprises a coiled tubing string extending from the surface and connected to the bottom hole assembly; a wave generator located at or near the surface to generate a tube wave in the well; at least one coiled tubing receiver located in the coiled tubing string to receive reflections of the tube wave, the at least one coiled tubing receiver selected from a surface receiver, a distributed sensor cable, or a combination thereof; at least one annulus receiver located in the annulus between the wellbore and the coiled tubing string to receive reflections of the tube wave, the at least one annulus receiver selected from a surface receiver, a distributed sensor cable, or a combination thereof; and a recorder to determine elapsed times between the tube wave generation and the receipt of the reflections thereof.

In some embodiments of the system, the wave generator is located in the coiled tubing, the annulus, or a combination thereof. In some embodiments, the system comprises surface receivers located in the annulus and coiled tubing string; and/or a microprocessor to calculate the depth of the bottom hole assembly based on one or more of the elapsed times.

In some embodiments of the system, the system further comprises an emitter in the bottom hole assembly to emit pressure waves in the well; a downhole receiver at a fixed distance relative to the emitter and adapted to sense respective responses to the emitted pressure waves; and a recorder to track elapsed time between the emission of the pressure waves from the emitter and the sensed responses at the downhole receiver.

In some embodiments of any of the methods herein, the reflector can be moved to different reflecting locations. In some embodiments, the method(s) comprise moving the reflector at a constant rate in the well, and/or reflecting the tube waves which may be generated at evenly spaced time intervals, depths of the reflector, or a combination thereof. In some embodiments, the reflector locations can be above, below and/or adjacent to one or more fractures in the well. For example, the location of the conductive fracture(s) can be determined by analyzing differences between the reflections received from the reflector in different locations.

In some embodiments, the method further comprises planning a treatment of the well based on the mapped fracture locations, and or implementing the treatment in accordance with the plan.

Two extreme types of tube wave reflection are of interest in some embodiments: those of a closed end wellbore, and those of an open end. A closed end is one in which there is little or no compliance at the reflector; a capped pipe is an example of this. The reflection will have the same sign (positive) as the interrogating signal (positive). The reflector in some embodiments will produce a reflection similar to that of a closed end, as the diameter of the reflector approaches the inside diameter of the casing or open wellbore.

An open end, on the other hand, is one in which there is a large compliance at the reflector; a pipe ending in a large tank is an example of this. Such compliance can consist of a significant sealed volume of fluid, a free surface, or a connection to a reservoir, such as a hydrocarbon reservoir. The reflection from an open end terminator will have the opposite sign (negative) of the interrogating signal (positive). The reflection from the reflector in some embodiments will produce a reflection similar to that of an open end when the reflector is adjacent to an open or otherwise conductive fracture.

Also, the fluid flow characteristics of the fracture adjacent to the reflector tool may affect the magnitude of the reflection; a free flowing connection, i.e., similar to an open end, produces a large negative reflection in response to a positive interrogation signal; a non-flowing connection, i.e., a closed end, produces a large positive reflection in response to a positive interrogation signal; whereas an open connection with significant flow resistance produces a smaller reflection which may have a positive or negative sign depending on the degree of flow conductivity, initially being less and less positive as the conductivity increases, then no reflection, and then increasingly negative as the conductivity increases to fully open.

According to some embodiments herein, the tube waves reflected from the reflector location are altered by the proximity of an open fracture, or a wellbore plug such as a ball or bridge plug. The reflection from a wellbore plug, normally having the same sign as the interrogating signal, implies that the sealing ball is properly placed and/or did not degrade. In some embodiments, degradation of a degradable diverter used to plug a fluid flow path, within the wellbore, e.g., a connection to the wellbore such as an open perforation and/or a fracture, and degradation is monitored using the reflection of the tube waves. The change or appearance of reflections from a reflector positioned near the diverter indicates degradation of the diverter and and/or readiness of the zone for production or injection.

In some embodiments, a sealed fracture which is not open to the well and/or in which a diverter has been placed produces substantially the same reflection from the reflector as when it is in a cased interval, and with the same sign. However, the change of the reflection from the reflector in the open perforation interval, typically to a negative sign compared to the interrogating signal, can indicate the presence, establishment or restoration of a hydraulic connection between the wellbore and the fracture zone, i.e., it is readied for injection or production as the case may be.

With reference to FIGS. 1A, 1B, 1C, wherein like numerals refer to like parts, there is shown an example of a reflector tool 10 in a well 12 in accordance with some embodiments of the present disclosure. The tool 10 is deployed at the end of coiled tubing 14 up or down the wellbore 16 by winding or unwinding the tubing from the spool.

The tool 10 is reflective owing to its diameter being larger than that of the tubing 14, and occupying a significant portion of the cross section of the annulus 17, e.g., an outer diameter greater than half (50%), or equal to or greater than 60%, or equal to or greater than 70%, or equal to or greater than 80%, or equal to or greater than 90%, relative to the inside diameter of the wellbore 16. In some embodiments, the tool 10 occupies a cross sectional area of the annulus 17 that is equal to or greater than 20%, or equal to or greater than 30%, or equal to or greater than 40%, or equal to or greater than 50%, or equal to or greater than 60%, or equal to or greater than 70%, or equal to or greater than 80%, or equal to or greater than 90%, or equal to or greater than 95%, of the cross sectional area of the annulus 17.

A tube wave source 18 operably positioned above the tool 10, e.g., at the surface or another fixed location, is used to send a tube wave 20 down the well 12. At the tool 10, some signal may pass the tool as wave 22, heading down, and some signal may reflect from the tool as wave 24 and travel back to sensor or receiver 28 operably positioned above the tool 10, e.g., at the surface or another fixed location, where it is received and or recorded. The location of the reflector tool 10 can be determined from the elapsed time between the generation of wave 20 and detection of the wave 24A, 24B, or 24C in respective FIGS. 1A, 1B, 1C. For example, the time vs. depth can be calibrated against known locations during deployment of the tool 10. This information may be important for improved location or depth accuracy where conventional tubing end locators may be inaccurate or unavailable.

In FIG. 1A, perforation 26 is located below the tool, and may only produce a small or undetectable reflection of the wave 22. However, in FIG. 2B, the tool 10 has been moved into a position adjacent to the perforation 26. In this case the character of the reflected wave 24B is strongly influenced by the perforation 26. In FIG. 1C, the tool 10 is located below the perforation 26, and the reflected wave 24C is little influenced by the perforation 26, leading to a returning wave 24D very similar to wave 24C.

Figure 2B:
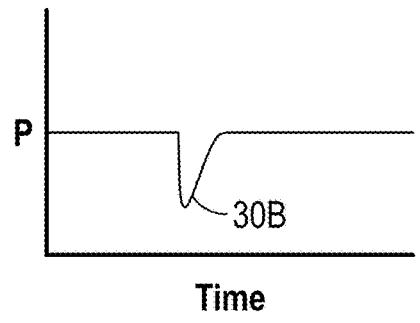
FIG. 2B is a qualitative pressure wave trace diagram from the sensor of FIG. 2B in accordance with some embodiments of the disclosure.

FIGS. 2A and 2B are qualitative signal trace diagrams for the sensor 28. In FIG. 2A, the positive reflection 30A produced from a positive tube wave pulse reflecting off of a closed end is shown, e.g., waves 24A and/or 24C in FIGS. 1A and 1C. In FIG. 2B, the negative reflection 30A produced from a positive tube wave pulse reflecting off of an open end is shown, e.g., wave 24B in FIG. 1B where perforation 26 is open or conductive.

Figure 3:
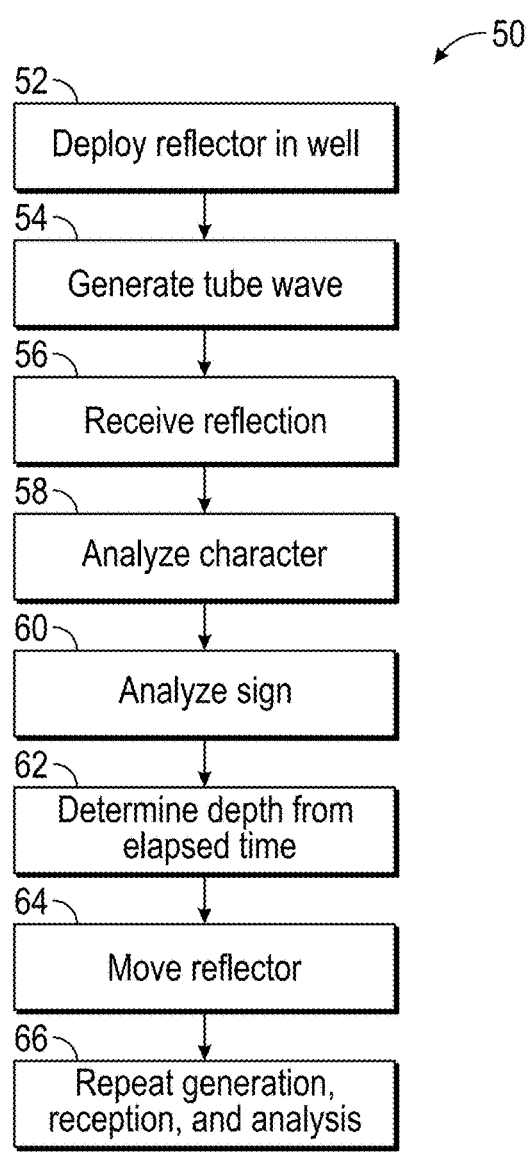
FIG. 3 is a process flow diagram illustrating the steps or operations in a method according to some embodiments of the disclosure.

With reference to FIG. 3, a process flow diagram illustrates some of the steps, operations, events, tasks, or features for fracture analysis or determination of tool and/or fracture locations according to the method 50. In operation 52, a reflector is deployed in a well such as a well having multiple fracture zones, e.g., with a wireline, coiled tubing, tractor, or the like. At a first location, a tube wave reflection 54 is followed by reception 56 and depth determination 58 from the elapsed time. In reflection analyses 60, 62, the sign and/or character of the reflection are determined. Then in step 64 the emitter is moved to a different location in the well, and in step 66 the tube wave generation 52, reception 54 and analyses 60 and/or 62 are repeated at the new location.

In some embodiments of the disclosure, the method 50 can be used in a re-fracturing operation where the reflective tool, e.g., a re-fracturing tool, is positioned near an area that may be re-fractured. The area is interrogated to locate the producing regions and or measure relative permeability. This information is used to choose the appropriate location to set the re-fracturing tool, producing a seal between the tool and the well bore. A fracturing treatment is then performed. After treatment the success may be measured by interrogating the re-fractured interval with the tube waves using the same or a different reflective tool or other reflector, and any desired analysis. Next, in some embodiments, a zonal isolation treatment may be pumped to seal this newly fractured zone against further operations. The effectiveness of this isolation treatment may also be checked by looking for a change in sign of the reflection. After this, the operation can proceed to a different zone(s), e.g., a deeper zone, and repeated as desired.

In some embodiments of the disclosure, the movable reflector can be considered as the equivalent of a movable source, since the reflected wave originates at the reflector. This system may be further generalized to include an actual source at the downhole end, either in lieu of the reflector or in addition to it. Such a source may comprise, for example, a modified perforating charge that does not perforate casing, but opens the gun housing; an electrically driven source such as one of many types used in marine seismic that are commonly called sparkers and boomers; exposed detonation cord and/or blasting cap, etc. In some embodiments, the downhole source can be a nozzle that makes noise when fluid is pumped down the coiled tubing and into the wellbore, and a microprocessor to determine elapsed times to the surface via autocorrelation.

Further, in some embodiments, the downhole source may be simulated by sending a tube wave down the inside of the coiled tubing, e.g., from source hardware located at the surface where it is not limited by the volume and power availability restrictions of a down hole device. In some embodiments, such an effectively moveable "source" may be further combined with a down hole sensor, independently positioned and/or in tandem with the down hole source, to acquire higher frequency information that could otherwise be attenuated by passage through the well.

Figure 4B:
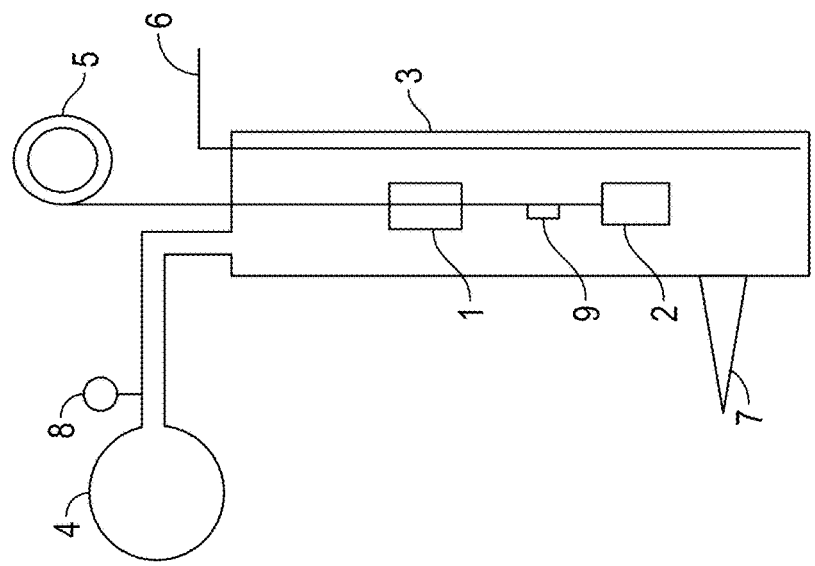
FIG. 4B is a schematic diagram of a feature detection system, involving a wireline, in accordance with some other embodiments of the present disclosure
Figure 4A:
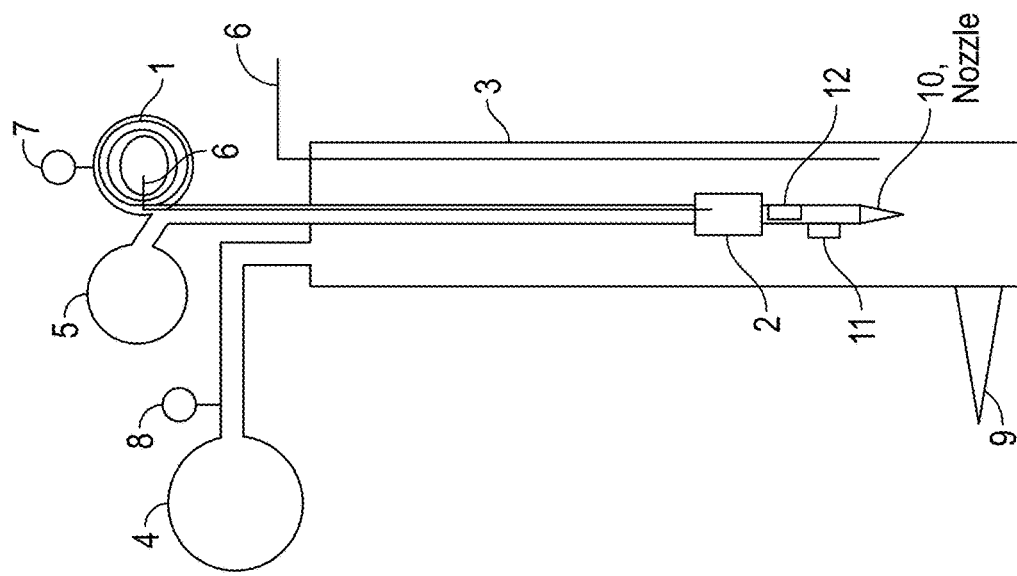
FIG. 4A is a schematic diagram of a feature detection system in accordance with some other embodiments of the present disclosure.

In some embodiments, a downhole tandem emitter-receiver tool may be used at a first frequency to gather locally generated data in the vicinity of the emitter-receiver tool, while a surface wave generator operating at a second frequency is used in conjunction with a moveable reflector, optionally on the emitter-receiver tool or a component thereof. For example, the surface generator can operate at a relatively lower frequency which is better suited for propagation over longer distances, while the emitter-receiver tool operates at a higher frequency to facilitate more accurate mapping and/or characterization of the well bore features, e.g., using the surface generator to accurately determine the position of the emitter-receiver tool and the emitter-receiver tool to accurately determine the position of conductive fractures relative to the emitter-receiver. In FIG. 4A downhole sensors 11 and 12 can either be interrogated by surface sources 4 (Annulus(3)) and 5 (Coiled tubing (1)) or by the nozzle or bottom hole emitter 10. The reflector 2 provides a known reflection point at a set distance from the sensors and can be used to calculate the depth of an open fracture 9 in the well. DVS 6 can pick up the pressure pulse as it moves down the annulus or the coil. Surface sensors 7 and 8 respectively read the coiled tubing responses and annulus responses. The bottom hole emitter 10 can be used to emit high frequency signals to be recorded by the downhole sensors 11 and 12, and the surface sources 5 and 4 can emit low frequency signals to map the annulus. FIG. 4B displays a similar scenario to 4A, but with wireline cable. Here the main difference is that the emitter is that signals are all generated in the annulus from the surface of down hole from the wireline BHA. It may as well include a nozzle or emitter 2 that redirects the annulus flow to create a noise source.

In some embodiments, by originating and/or reflecting signals at multiple locations in the wellbore, the signal response of blank pipe may be compared with one or more zones that are connected with the formation, such as through a perforation or a fracturing valve. This comparison allows measurement of either or both the fluid flow characteristics of the opening and/or the characteristics of the fracture itself. Further, in some embodiments, this scanning action tied to the known location and/or relative movement of the reflector/source can significantly increase the resolution of the tube wave technique due to the additional and/or more accurate information.

In some embodiments, where the tool has tubing end locator(s) or similar sensors, such as a casing collar locator or a nipple locator, information from these sensors may be used to precisely locate the reflecting tool, source, and/or pressure sensor to improve the efficiency and/or accuracy of the gathering of information about the well. For example, precise location determinations can be directly compared to the elapsed time of wave travel to surface or other sensor location(s), and or used to calibrate the elapsed time versus depth, leading to much more accurate measurements and/or mapping of the formation characteristics.

Figure 5:
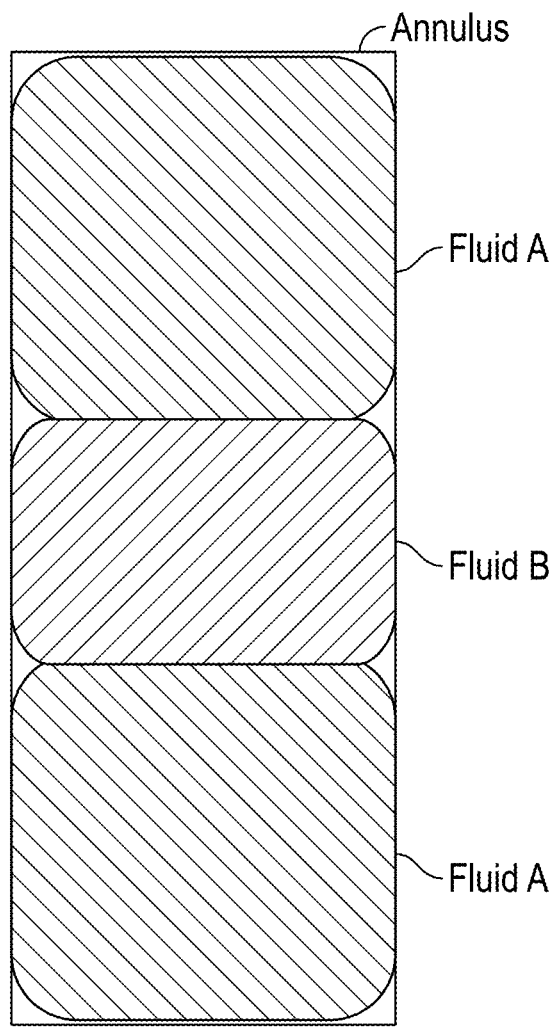
FIG. 5 is a schematic diagram where the reflector might be the interface between multifluids.

In some embodiments of the disclosure, the reflector comprises an interface between treatment fluids, e.g., immiscible fluids, with contrasting tube wave velocities. In FIG. 5 a reflection may occur at the interfaces between fluids A and B. Such fluids can include, for example, various combinations of relatively heavy and light fluids, e.g., dense fluids (specific gravity equal to or greater than 1.05) such as slurries or brines, and/or low density fluids (specific gravity less than or equal to 1) such as oils, alcohols, naphtha, acetone, microballoon-filled slurries, foams, and so on. These fluids can be pumped, and thus moved to different locations in the welbore, using a remote driving source such as a surface pump; and/or fluids such as foams, brines, and oils as non-limiting examples, may be selected to have little or no adverse impact, or a beneficial impact, on the formation, if they are introduced into the formation, either deliberately as part of the well treatment and/or inadvertently.

Figure 6:
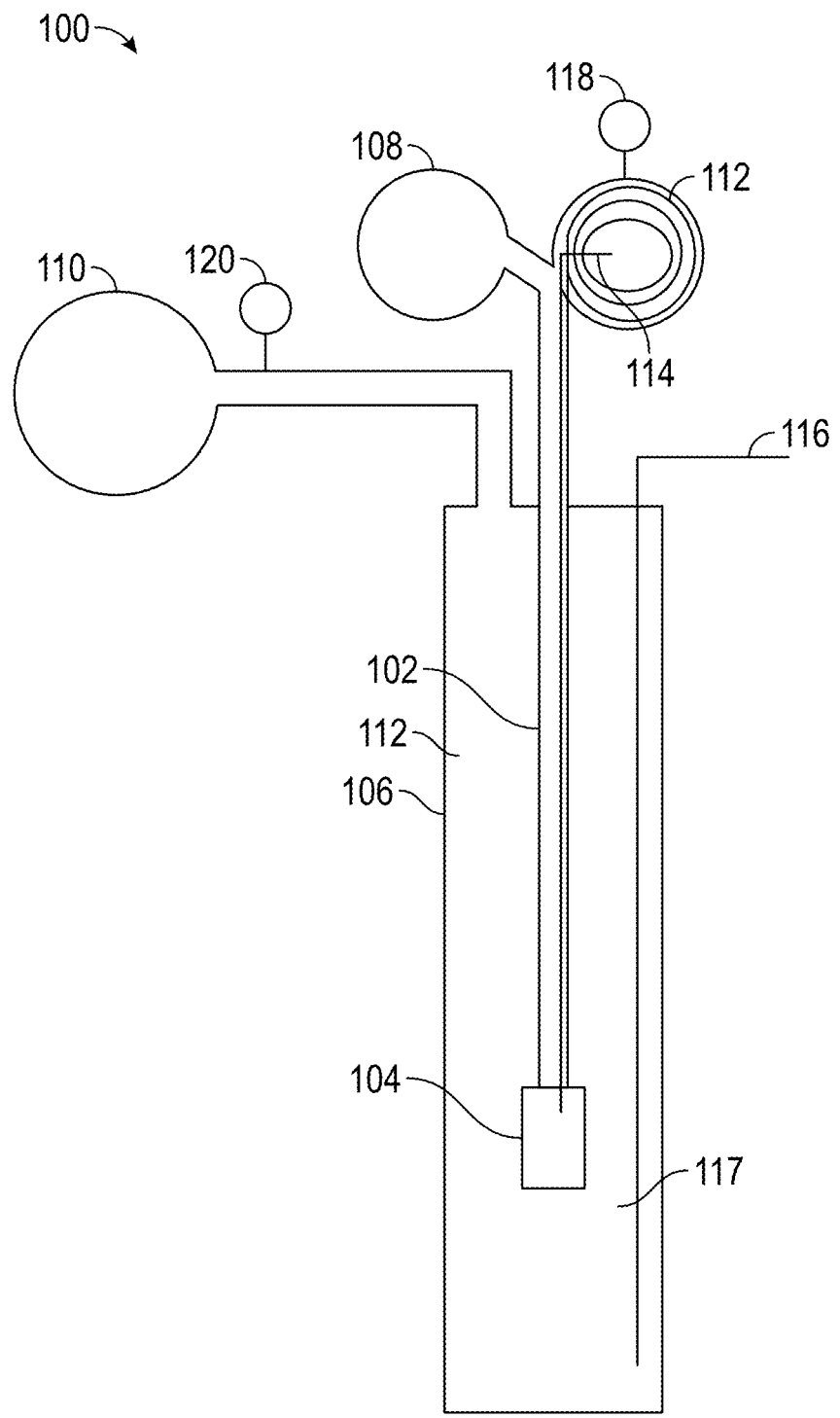
FIG. 6 is a schematic diagram of a feature detection system in accordance with some other embodiments of the present disclosure.

In FIG. 6, well feature detection and/or locating system 100 according to some embodiments of the disclosure comprises coiled tubing 102 and bottom hole assembly (BHA) 104 located in the wellbore 106. Surface wave generators 108, 110 can produce a wave generated inside the coiled tubing 102 or the wellbore annulus 112, respectively. These sources may be pumps or other equipment capable of creating pulses.

Distributed cable sensors 114, 116 can be placed in the coiled tubing 102 or the wellbore 106 to track waves as they propagate through the wellbore annulus 112 from one of the sources 108, 110 and/or the BHA 104 or other sources or reflectors. The cable sensors 114, 116 can capture vibrational changes or receive other signals from the waves passing to or from the BHA 104, for example. Tubing sensor 118 at the surface is attached at the start of the coiled tubing 102, e.g., at a location outside the wellbore 106, to provide measurements of any waves propagating inside the coiled tubing 102. Wellbore sensor 120 similarly provides wellbore measurements at the surface from the annulus 112.

In some embodiments, a wave propagating in the coiled tubing 102 may be affected by diameter changes between the inside and/or outside diameters of the coiled tubing 102 and the BHA 104. For example, the coiled tubing 102 may have a relatively large inside diameter, e.g., about 25 mm (1 in.) or greater, whereas the BHA 104 may have a smaller inside diameter for fluid flow, e.g., about 22 mm (⅞ in.) or smaller, and stepping down the inside diameters in this manner may result in a reflection of at least some of the wave back up the coiled tubing, and/or transmission of a partially reduced wave into the wellbore 106.

Similarly, differences between the outside diameters of the coiled tubing 102 and the BHA 104, e.g., a larger BHA 104, will result in a reduction in the cross-sectional area of the annulus 112, wherein the BHA 104 becomes a reflective tool as discussed above; and a wave propagating in the wellbore 106 may reflect off of the BHA 104 due to the change in diameter, and any remaining wave may be transmitted through the annulus 117 between the BHA 104 and the wellbore 106.

In some embodiments, the BHA 104 may also comprise of an assortment of one or more check valves that direct flow down the inside of the coiled tubing 102 out into the wellbore 106, annulus 117 and/or annulus 116, that may affect the reflection and/or transmission of waves at the BHA 104. For example, if the check valve(s) is closed, waves propagated inside the coiled tubing 102 or annulus 116 may reflect at the BHA 104, but there may be no transmission between the tubing 102 and the wellbore 106; or if open, such waves may be transmitted and reflected, but the character of the reflected wave(s) may be different than when the check valve is closed. Additionally, in some further embodiments, the opening of the check valve, e.g., by initiation of fluid flow or a sufficiently large amplitude of the wave itself, may generate a water or other fluid hammer that can be used as another wave-generating source at the BHA 104, either alone or in addition to any reflecting or transmitting wave, and propagating in the coil 102 and/or in either or both directions in the wellbore 106.

In some embodiments, in addition to and/or in lieu of any reflection at or other generation of waves from the BHA 104, the flow of fluid through the BHA may generate characteristic vibrations or other noise at the same or different frequency, which can be used as an independent or adjunct means to determine and/or confirm the depth of the BHA 104. For example, the BHA 104 may effectively comprise a nozzle with emitted noise variations that can be autocorrelated by surface and/or downhole sensors to determine the elapsed time for travel to the surface, and thus the depth of the BHA 104.

EMBODIMENTS LISTING

In some aspects, the disclosure herein relates generally to well re-stimulation methods and/or workflow processes according to the following Embodiments, among others:

Embodiment 1

A method, comprising: (a) deploying a moveable tube wave reflector to a first location in the well; (b) generating a tube wave in the well; (c) receiving a reflection of the tube wave from the reflector; (d) determining the depth of the reflector based on the time between the tube wave generation and receipt of the reflection; (e) moving the reflector to a second location in the well; and (f) after moving the reflector, repeating the tube wave generation (b), the reflection receipt (c), and the determination of the depth of the reflector (d).

Embodiment 2

The method of Embodiment 1, wherein the reflector comprises an interface between fluids of contrasting tube wave velocity.

Embodiment 3

The method of Embodiment 1 or Embodiment 2, wherein the reflector comprises a reflective tool.

Embodiment 4

The method of Embodiment 3, wherein the tool has an outside diameter equal to or greater than half that of the wellbore at the first and second locations.

Embodiment 5

The method of Embodiment 3 or Embodiment 4, wherein the tool is deployed on the end of a coiled tubing string.

Embodiment 6

The method of any one of Embodiments 1 to 5, further comprising analyzing the sign of the reflection received relative to the tube wave generated to determine the presence or absence of a wellbore feature adjacent to the reflector.

Embodiment 7

The method of any one of Embodiments 1 to 6, further comprising analyzing the character of the reflection received to determine the presence or absence of an open fracture adjacent to the reflector by analyzing the sign of the reflection received relative to the tube wave generated, and or, if the fracture is present, to estimate the conductivity of the fracture by analyzing the magnitude of the reflection received.

Embodiment 8

The method of any one of Embodiments 1 to 7, comprising interrogating an interval of the well adjacent to the reflector with a pressure wave emitter at the location of the reflector to determine the spacing of a fracture in the interval relative to the reflector, and thus the depth of the fracture.

Embodiment 9

The method of Embodiment 8, wherein the interrogating pressure wave comprises the tube wave reflection.

Embodiment 10

The method of Embodiment 8 or Embodiment 9, wherein the interrogation comprises discharging an explosive, sparker, boomer, or a combination thereof.

Embodiment 11

The method of any one of Embodiments 8 to 10, wherein the interrogation comprises transmitting the pressure wave through a coiled tubing string in the well connected to the pressure wave emitter.

Embodiment 12

The method of any one of Embodiments 8 to 11, further comprising receiving a reflection of the interrogating pressure wave from the fracture at a downhole receiver moveable in tandem with the emitter.

Embodiment 13

The method of any one of Embodiments 1 to 12, wherein the well is a producing well and the method comprises maintaining production during one or more or all of (a), (b), (c), (d), (e), and (f).

Embodiment 14

A method to locate a feature in a well comprising a wellbore, a coiled tubing string connected to a bottom hole assembly, an annulus in an upper section of the well above the bottom hole assembly, and a lower section of the well between the end of the coiled tubing and a downhole reference, the method comprising: (a) deploying the bottom hole assembly to a first location in the well; (b) generating a tube wave in the well from a surface wave generator; (c) receiving a reflection of the tube wave from the bottom hole assembly; (d) determining the depth of the bottom hole assembly based on the time between the tube wave generation and receipt of the bottom hole assembly reflection; (e) moving the bottom hole assembly to a second location in the well; and (f) after moving the bottom hole assembly, repeating the tube wave generation (b), the reflection receipt (c), and the determination of the depth of the bottom hole assembly (d).

Embodiment 15

The method of Embodiments 14, further comprising moving the bottom hole assembly in the well to one or more additional locations and repeating the tube wave generation (b), the reflection receipt (c), and the determination of the depth of the bottom hole assembly (d), at the one or more additional locations.

Embodiment 16

The method of Embodiment 14 or Embodiment 15, wherein the surface wave generator generates the tube wave into the annulus, the coiled tubing string, or a combination thereof.

Embodiment 17

The method of any one of Embodiments 14 to 16, wherein the tube wave reflection from the bottom hole assembly is received with one or both of a surface receiver and a distributed sensor cable, located in the annulus, in the coiled tubing string, or a combination thereof.

Embodiment 18

The method of any one of Embodiments 14 to 17, further comprising: receiving a reflection of the tube wave from the downhole reference with one or both of a surface receiver and a distributed sensor cable; wherein one or more of the surface receivers, if present, are located in the annulus, in the coiled tubing string, or a combination thereof; wherein one or more of the distributed sensor cables, if present, are located in the annulus, in the coiled tubing string, or a combination thereof; and wherein the determination of the depth of the bottom hole assembly is based on a plurality of the times between the tube wave generation and the receipt of a like plurality of the reflections from the bottom hole assembly, the downhole reference, or a combination thereof.

Embodiment 19

The method of any one of Embodiments 14 to 18, further comprising flowing fluid through the bottom hole assembly to open a check valve for fluid communication between the coiled tubing string and the wellbore and permit passage of the tube waves and/or reflections between the coiled tubing string and the wellbore.

Embodiment 20

The method of any one of Embodiments 14 to 19, further comprising interrogating an interval of the well adjacent to the bottom hole assembly with a pressure wave emitted into the well from the bottom hole assembly to determine spacing of a fracture in the interval relative to the bottom hole assembly, and thus the depth of the fracture.

Embodiment 21

The method of Embodiment 20, wherein the interrogation comprises transmitting the pressure wave from the surface through the coiled tubing string to the bottom hole assembly.

Embodiment 22

The method of Embodiment 20 or Embodiment 21, further comprising receiving a reflection of the interrogating pressure wave from the fracture at a downhole receiver mounted (at an outside or inside surface) on the coiled tubing and moveable in tandem with the bottom hole assembly.

Embodiment 23

The method of Embodiment 22, further comprising moving the bottom hole assembly in the well and repeating the interval interrogation at one or more additional locations.

Embodiment 24

A method to locate a feature in a well comprising a wellbore, a coiled tubing string connected to a bottom hole assembly, an annulus in an upper section of the well above the bottom hole assembly, and a lower section of the well between the end of the coiled tubing and a downhole reference, the method comprising: deploying the bottom hole assembly to a location in the well; generating acoustic noise from the bottom hole assembly to initiate tube waves in the annulus; receiving the tube waves at a surface receiver in the annulus; autocorrelating the acoustic noise and the tube waves received to determine the elapsed time between the generation of the noise and the receipt of the waves; and determining the depth of the bottom hole assembly based on the elapsed time.

Embodiment 24A

The method of Embodiment 24 wherein the bottom hole assembly comprises a nozzle.

Embodiment 25

A system to determine the depth of a bottom hole assembly in a well, comprising: a coiled tubing string extending from the surface and connected to the bottom hole assembly; a wave generator located at or near the surface to generate a tube wave in the well; at least one coiled tubing receiver located in the coiled tubing string to receive reflections of the tube wave, the at least one coiled tubing receiver selected from a surface receiver, a distributed sensor cable, or a combination thereof; at least one annulus receiver located in the annulus between the wellbore and the coiled tubing string to receive reflections of the tube wave, the at least one annulus receiver selected from a surface receiver, a distributed sensor cable, or a combination thereof; and a recorder to determine elapsed times between the tube wave generation and the receipt of the reflections thereof.

Embodiment 26

The system of Embodiment 25, wherein the wave generator is located in the coiled tubing, the annulus, or a combination thereof.

Embodiment 27

The system of Embodiment 25 or Embodiment 26, comprising surface receivers located in the annulus and coiled tubing string.

Embodiment 28

The system of any one of Embodiments 25 to 27, further comprising a microprocessor to calculate the depth of the bottom hole assembly based on one or more of the elapsed times.

Embodiment 29

The system of any one of Embodiments 25 to 28, further comprising: an emitter in the bottom hole assembly to emit pressure waves in the well; a downhole receiver at a fixed distance relative to the emitter and adapted to sense respective responses to the emitted pressure waves; and a recorder to track elapsed time between the emission of the pressure waves from the emitter and the sensed responses at the downhole receiver.

EXAMPLES

Figure 7:
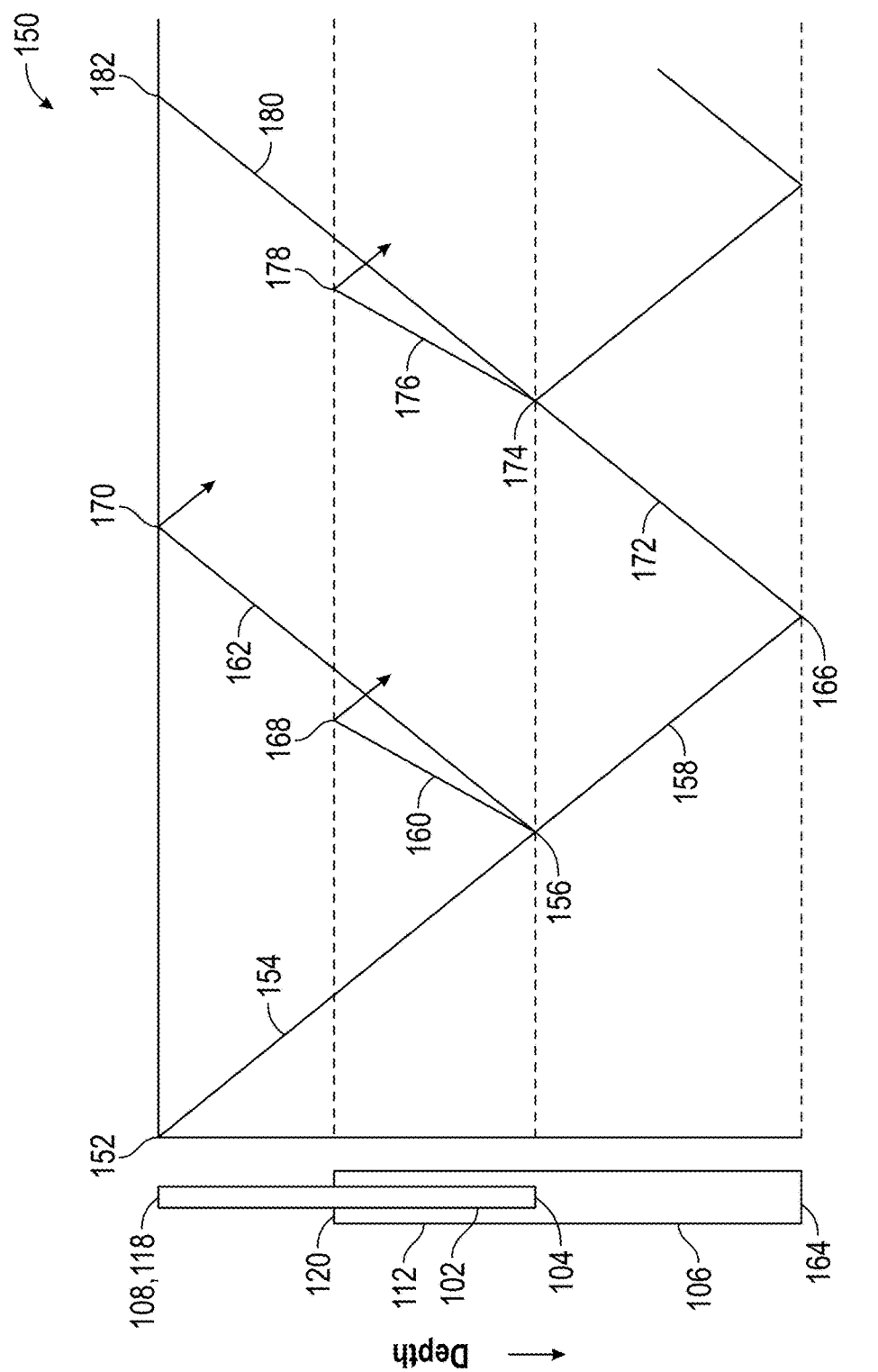
FIG. 7 is a schematic ray tracing chart for tubing-generated signal modes of the feature detection system of FIG. 3 in accordance with some embodiments of the present disclosure.

The progress of pulses originating from the coiled tubing generator 108 of FIG. 6 and traveling down the coiled tubing 102 are shown in the ray-tracing chart 150 seen in FIG. 7 where origin 152 is time t=0. When the pulse 154 reaches the end of the coiled tubing 102 at the depth of the BHA 104 at time 156, three waves 158, 160, 162 are produced. Wave 158 goes downhole and reflects off the down hole reference (DHR) 164 at time 166. Wave 160 goes up the annulus 112, and at time 168 reaches transducer 120 located on the wellhead, and wave 162 goes up the coiled tubing 102 and reaches the circulating pressure transducer 118 at the swivel at time 170.

The reflection 172 from the DHR 164 is further split at time 174 when it encounters the BHA 104; wave 176 in the annulus 112 reaches the wellhead sensor 120 at time 178; and wave 180 in the coiled tubing 102 reaches the circulating pressure transducer 118 at time 182.

The relative speed of propagation of the tube waves in the depth v. time plot of FIG. 7 is qualitatively indicated by the slope of the trace. Velocity in the coiled tubing 102 may be slower than that in the well bore annulus 112 because the coiled tubing generally lacks the wall rigidity of the wellbore 106, since casing can be reinforced by cementing and connection to rock. Thus, the wave fronts 162, 180 in the coiled tubing 102 have a somewhat lower velocity slope than the wave fronts 160, 176 in the annulus 112. By comparing the arrival times of the various echoes, the physical distances between the coiled tubing end 104 and the well top 120 and/or DHR 164 may be calculated or otherwise determined.

Figure 8:
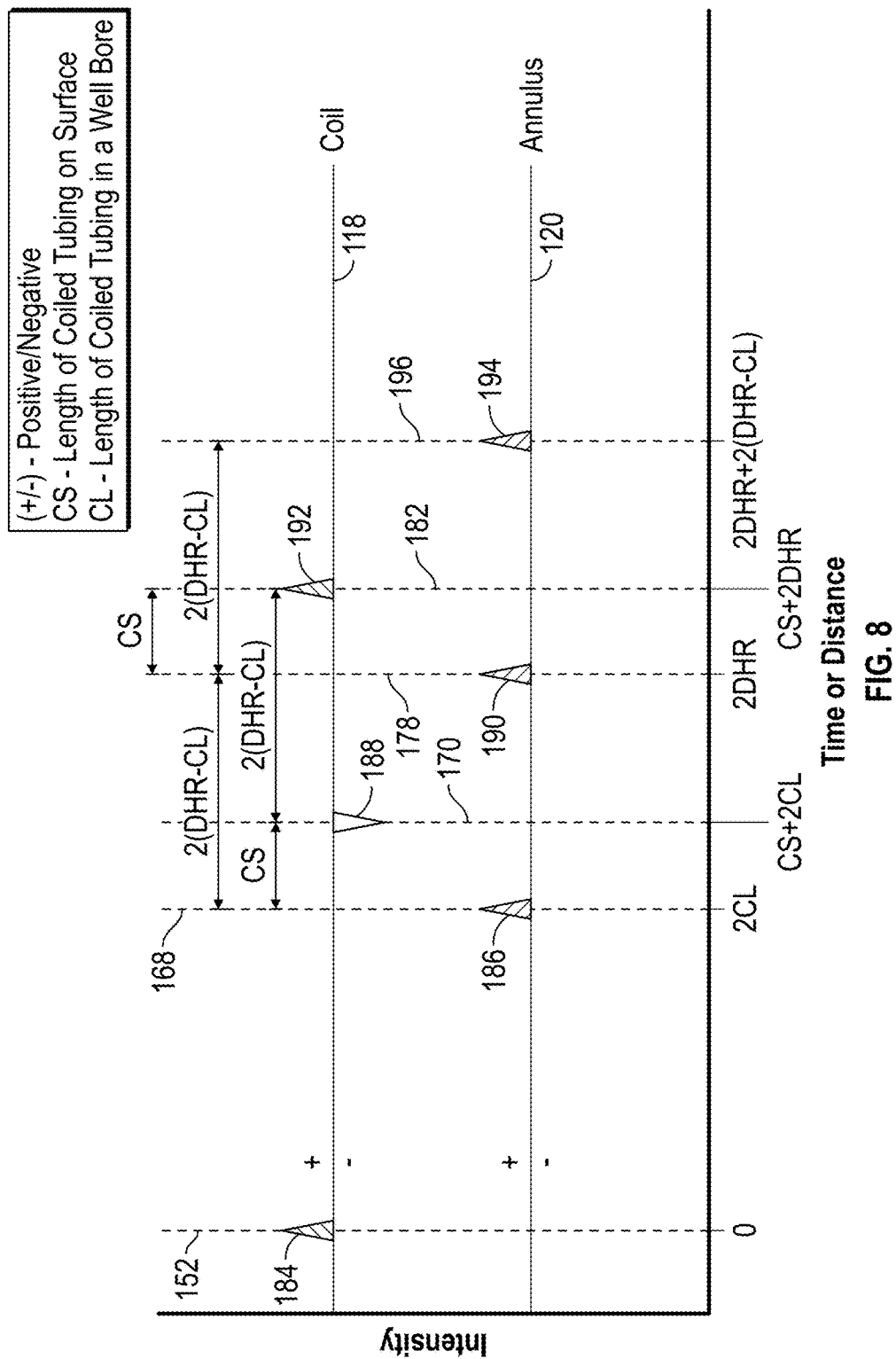
FIG. 8 is a qualitative depth-time chart for tubing-generated signal modes of the feature detection system of FIGS. 3 and 4 in accordance with some embodiments of the present disclosure.

FIG. 8 relates the times and events from the annulus-interrogation example of FIG. 7 in corresponding echo traces for each of the coiled tubing sensor 118 and the wellbore (annulus) sensor 120. On the axes, FIG. 8 displays the distance traveled (bottom) and some simplified time-proportionality equations (top) that may be used to find the physical length. The equations shown for this example assume the same velocities in the tubing 102 and annulus 112 for the purpose of simplification, and these may thus need to be adjusted to take the different wave velocities into account. FIG. 8 also indicates the sign (positive or negative) of the echoes 184, 186, 188, 190, 192, 194 for this example by showing the direction of the peak. Note that this is just one example of the signs of the peaks, which may differ from those shown in FIG. 8, depending on the geometry of the BHA 104 and DHR 164, as well as the presence of any adjacent fractures or other features. These data are also presented in Table 1.

Also, wave 180 inside the coiled tubing 102 may or may not appear at time 182 depending on the state of any check valves in the BHA 104. In some embodiments, if pumping at a high enough rate, the check valves may stay open to allow the signal 172 to transit the BHA 104 into the coiled tubing 102. In some embodiments, the signal 172 may also have a high enough amplitude to cycle the check valve itself, thereby causing wave 180 (and/or wave 178) to propagate as a water hammer back up to the surface. In some embodiments, either the signal passing through the check valve or the water hammer could be used to find the depth of the BHA 104.

TABLE 1

Echo Times and distances traveled from annulus interrogation

| Sensor | Echo | Sign | Time | Distance traveled | Distance proportionality[a] |
|---|---|---|---|---|---|
| Tubing | 184 | + | t(152) = 0 | 0 | N/A |
| Annulus | 186 | + | t(168) | CS + 2 * CL | (CS + 2 * CL) ∝ t(168-168) |
| Tubing | 188 | − | t(170) | 2 * CS + 2 * CL | CS ∝ t(170-168) |
| Annulus | 190 | + | t(178) | CS + 2 * DHR | 2(DHR-CL) ∝ t(178-168) |
| Tubing | 192 | + | t(182) | 2 * CS + 2 * DHR | 1. CS ∝ t(182-178) 2. 2(DHR-CL) ∝ t(182-170) |
| Annulus | 194 | + | t(196) | CS + 2 * DHR + 2(DHR-CL) | 2(DHR-CL) ∝ t(96-178) |

Figure 9:
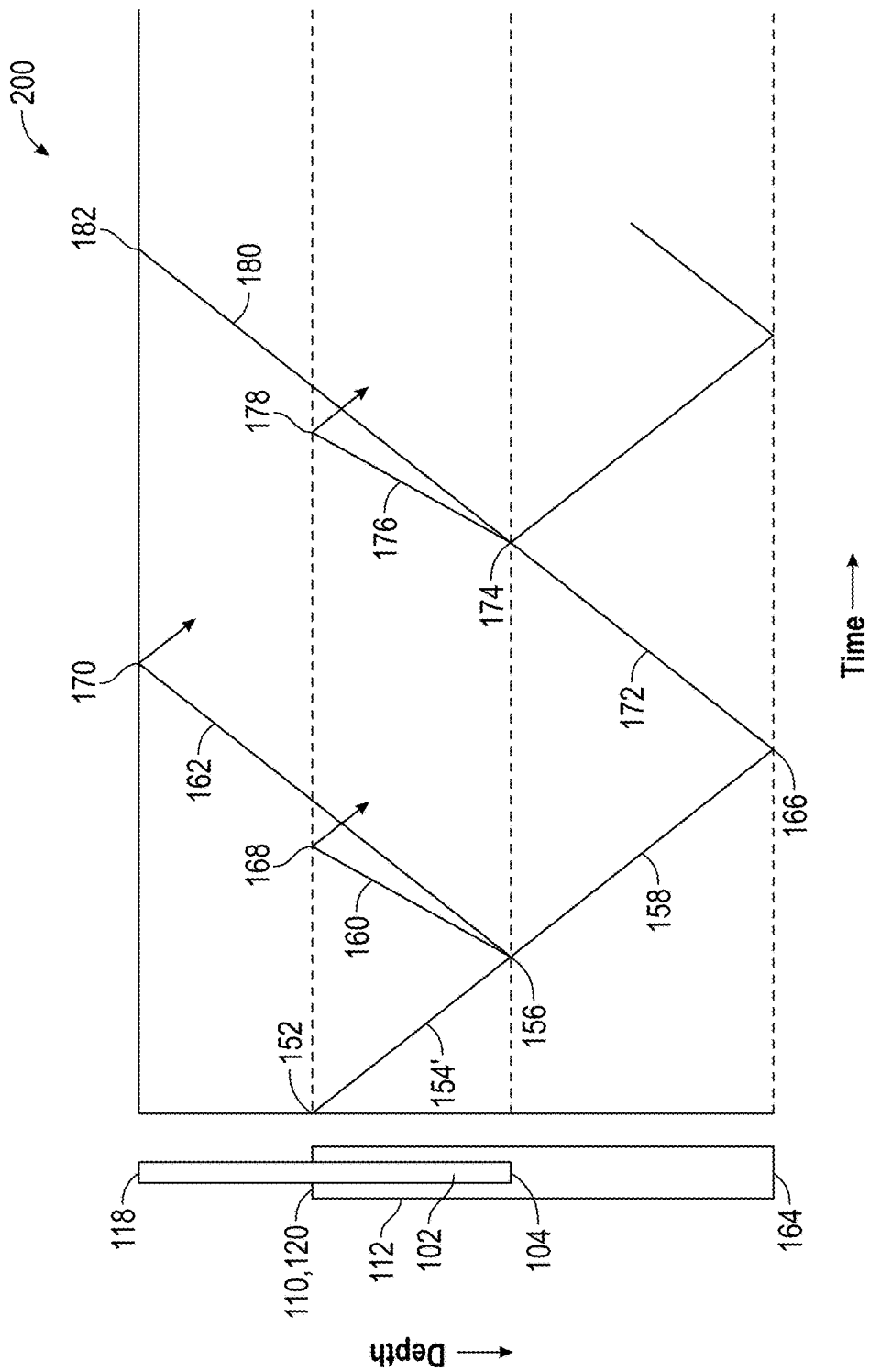
FIG. 9 is a schematic ray tracing chart for annulus-generated signal modes of the feature detection system of FIG. 3 in accordance with some embodiments of the present disclosure.
Figure 10:
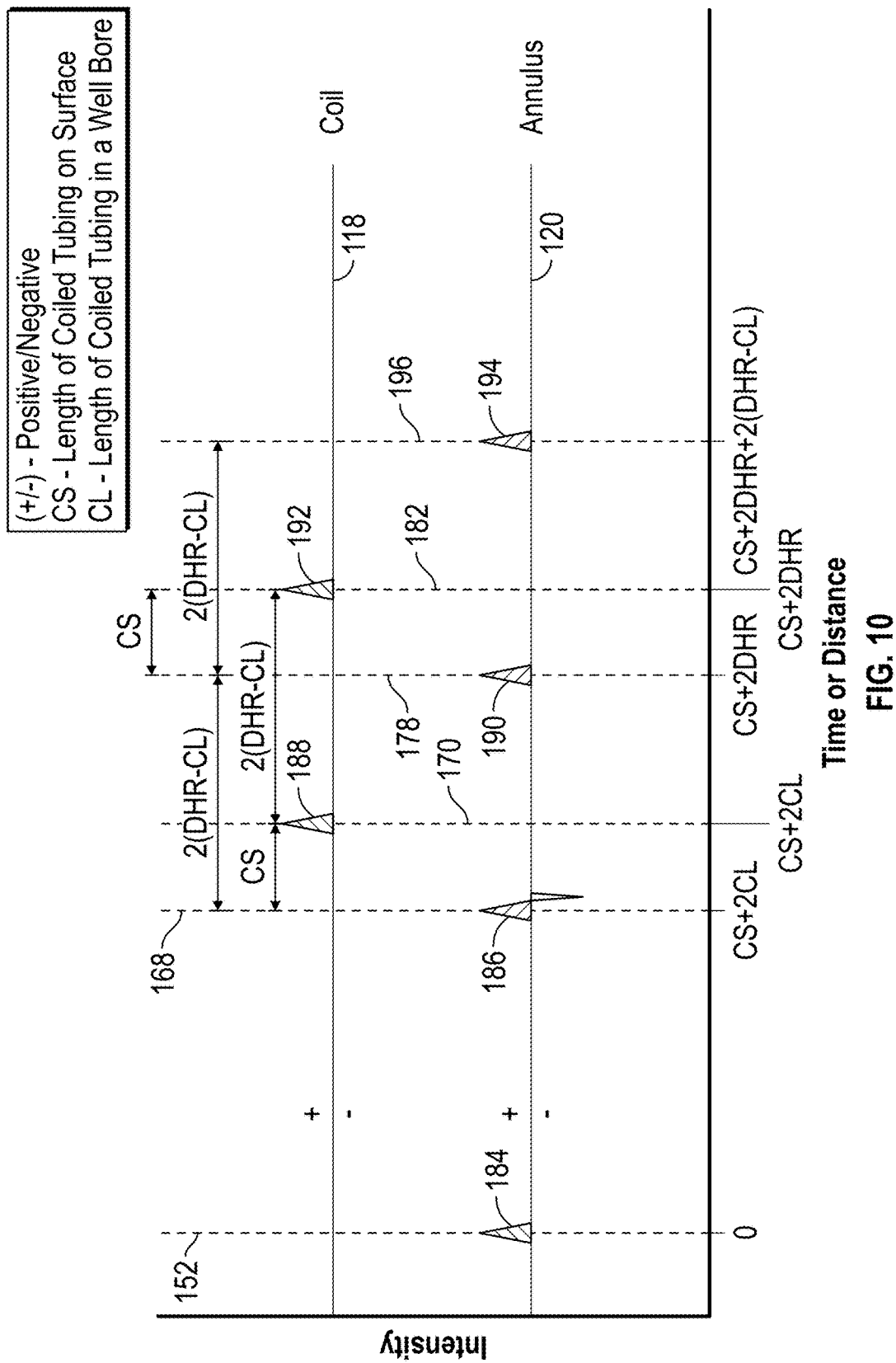
FIG. 10 is a qualitative depth-time chart for the annulus-generated signal modes of the feature detection system of FIGS. 3 and 6 in accordance with some embodiments of the present disclosure.

Abbreviations:
CS = Surface tubing length
CL = Wellbore tubing length
DHR = Wellbore length to downhole reference
[a]assumes the same wave velocity in the tubing and wellbore/annulus The progress of waves from pulses originating from the annulus generator 110 of FIG. 6 are similarly shown in the ray-tracing chart 200 seen in FIG. 9, and the corresponding echo traces and equations in FIG. 10 and Table 2 below, using the same event and time references as in FIGS. 7 and 8. In FIGS. 9 and 10, when the annulus/wellbore-originating pulse 154' reaches the end of the coiled tubing 102 at the depth of the BHA 104 at time 156, the three waves 158, 160, 162 are produced, and these progress in the same manner as described in reference to FIGS. 7 and 8 above. In this example, however, at time 168 the depth of the BHA 104 can be readily determined since the velocity of pulse 54' and 160 are presumably the same and the system can already be calibrated against a feature of known depth, and the depth is simply the product of the velocity and one half of the elapsed time. If available, the echoes 188, 190, 192, 194 at respective times 170, 178, 182, 196, can provide additional information to confirm the depth of the BHA 104 and/or determine additional differences in depth with respect to the surface and/or DHR 164.

TABLE 2

Echo Times and distances traveled from wellbore/annulus interrogation

| Sensor | Echo | Sign | Time | Distance traveled | Distance proportionality[a] |
|---|---|---|---|---|---|
| Annulus | 184 | + | t(152) = 0 | 0 | N/A |
| Annulus | 186 | + | t(168) | 2 * CL | 2 * CL ∝ t(168-152) |
| Tubing | 188 | − | t(170) | CS + 2 * CL | CS ∝ t(170-168) |
| Annulus | 190 | + | t(178) | 2 * DHR | 2(DHR-CL) ∝ t(178-168) |
| Tubing | 192 | + | t(182) | CS + 2 * DHR | 1. CS ∝ t(182-178) 2. 2(DHR-CL) ∝ t(182-170) |
| Annulus | 194 | + | t(196) | 2 * DHR + 2(DHR-CL) | 2(DHR-CL) ∝ t(96-178) |

Figure 11A:
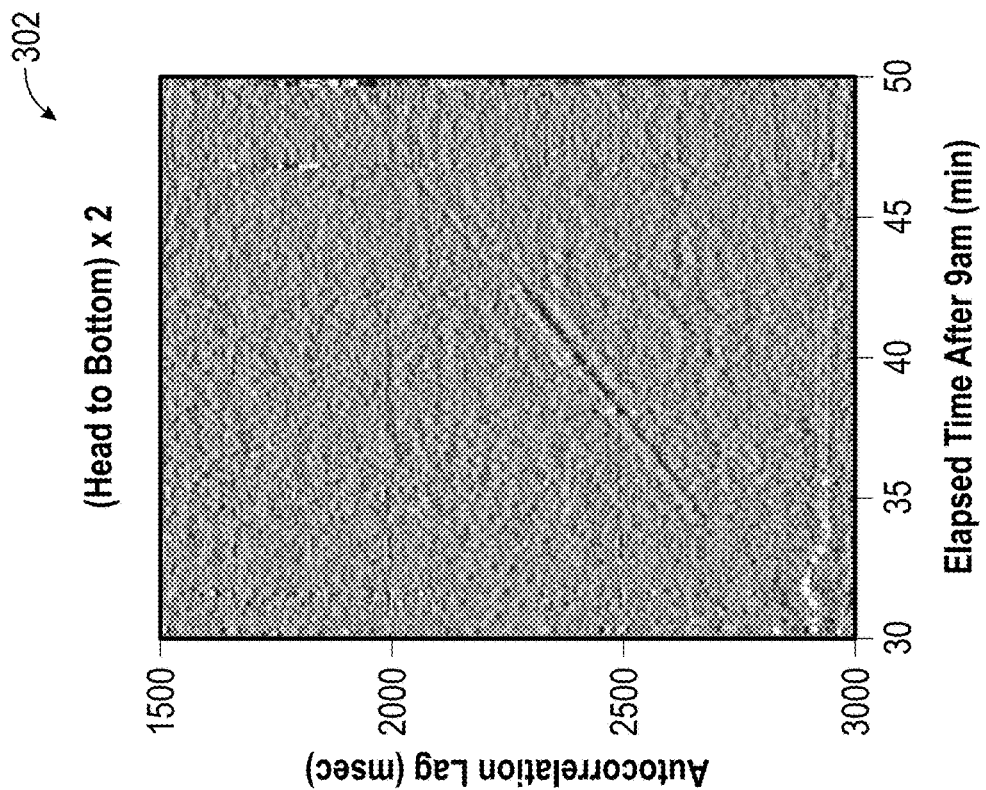
FIG. 11A is an autocorrelation log of the source depth from surface for a colored noise source generated at the end of coiled tubing in a well in accordance with some embodiments of the present disclosure.
Figure 11B:
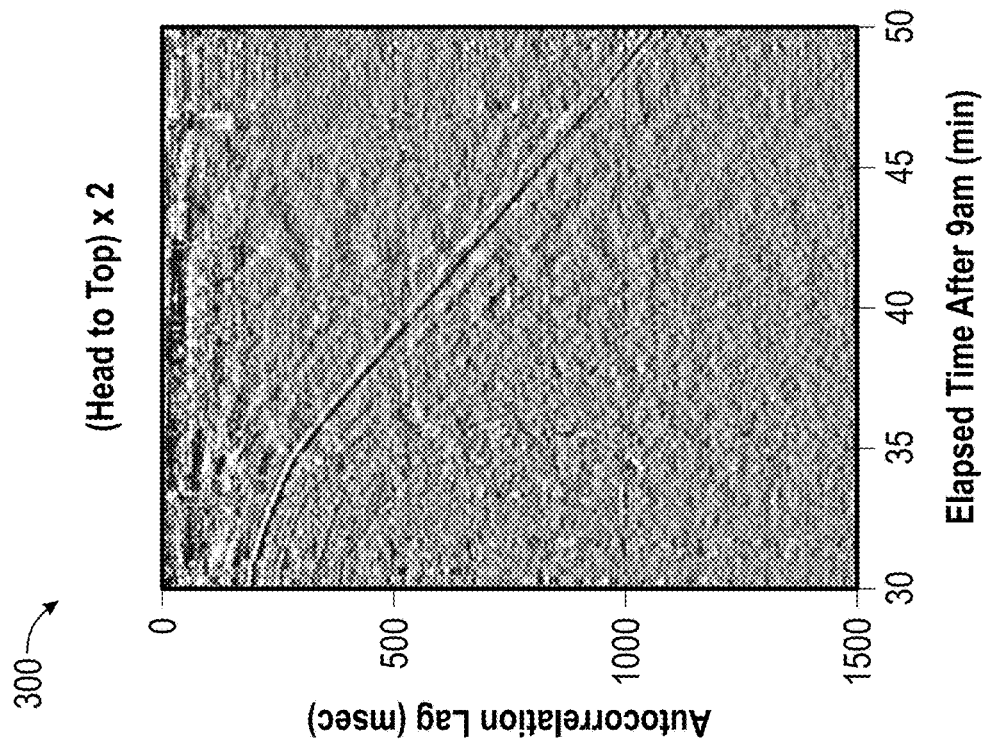
FIG. 11B is an autocorrelation log of the source depth to bottom hole for a colored noise source generated at the end of coiled tubing in a well in accordance with some embodiments of the present disclosure.

Abbreviations:
CS = Surface tubing length
CL = Wellbore tubing length
DHR = Wellbore length to downhole reference
[a]assumes the same wave velocity in the tubing and wellbore/annulus In some embodiments of this disclosure, noise generated during pumping is used as a pulse source to track the location of the BHA 104 (FIG. 6) To demonstrate the concept by way of an example, a BHA 104 was attached to a 38 mm (1.5 in.) coiled tubing 102 to provide a diameter change to 22 mm (⅞ in.) and act as a nozzle to generate noise as the BHA was lowered into a wellbore at the end of the tubing. The noise contained frequency information to permit autocorrelation with a surface sensor or with the trace of a DVS sensor inside the wellbore and/or inside the coiled tubing. In this example, the noise was correlated with its copies received at a tubing or annulus surface sensor to determine the time lag, corresponding to the depth of the BHA 104, as shown in FIGS. 11A and 11B. FIG. 11A shows the autocorrelation lag 300 (in milliseconds) from the BHA to the surface increasing as the BHA was lowered; and FIG. 11B shows the autocorrelation lag 302 (in milliseconds) from the BHA to bottom hole decreasing at the same time. The depth of the BHA was readily ascertained using calibration data.

Although only a few exemplary embodiments have been described in detail above, those skilled in the art will readily appreciate that many modifications are possible in the example embodiments without materially departing from this disclosure. For example, any embodiments specifically described may be used in any combination or permutation with any other specific embodiments described herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' or 'step for' together with an associated function without the recitation of structure.

What is claimed is:

1. A method, comprising:
    (a) deploying a moveable tube wave reflector to a first location in a well;
    (b) generating a tube wave in the well;
    (c) receiving a reflection of the tube wave from the moveable tube wave reflector in response to the tube wave;
    (d) determining a depth of the moveable tube wave reflector based on a time difference between a first time at which the tube wave is generated and a second time at which the reflection is received;
    (e) analyzing a sign of the reflection relative to the tube wave to determine a presence or an absence of a wellbore feature adjacent to the moveable tube wave reflector;
    (f) moving the moveable tube wave reflector to a second location in the well; and
    (g) after moving the moveable tube wave reflector, repeating the generation of the tube wave (b), the receiving of the reflection (c), the determination of the depth of the moveable tube wave reflector (d), and the analyzing of the sign (e).

2. The method of claim 1, wherein the moveable tube wave reflector comprises an interface positioned between a plurality of fluids, wherein each fluid of the plurality of fluids comprises a different tube wave velocity.

3. The method of claim 1, wherein the moveable tube wave reflector comprises a reflective tool.

4. The method of claim 3, wherein the reflective tool has an outside diameter equal to or greater than half of a first respective diameter of the wellbore at the first location and a second respective diameter of the wellbore at the second location.

5. The method of claim 3, wherein the reflective tool is deployed on an end of a coiled tubing string.

6. The method of claim 1, further comprising:
    analyzing a character of the reflection to determine an additional presence or an additional absence of an open fracture adjacent to the moveable tube wave reflector by analyzing the sign of the reflection relative to the tube wave; and
    if the open fracture is present, to estimating the conductivity of the open fracture by analyzing a magnitude of the reflection.

7. The method of claim 1, further comprising interrogating a first and a second interval of the well adjacent to the moveable tube wave reflector with a pressure wave emitter at the first and second locations of the moveable tube wave reflector to determine a spacing of a corresponding fracture in the first and second intervals relative to the moveable tube wave reflector, wherein the spacing of the corresponding facture is used to determine the depth of the fracture.

8. The method of claim 7, wherein the first and the second interval of the well is interrogated with the pressure wave emitter based on the reflection.

9. The method of claim 7, wherein interrogating the first and the second interval of the well with the pressure wave emitter comprises discharging an explosive, sparker, boomer, or a combination thereof.

10. The method of claim 7, wherein interrogating the first and the second interval of the well with the pressure wave emitter comprises transmitting a pressure wave through a coiled tubing string in the well connected to the pressure wave emitter.

11. The method of claim 7, further comprising receiving an additional reflection associated with interrogating the first and the second interval of the well with the pressure wave emitter from the corresponding fracture at a downhole receiver moveable in tandem with the pressure wave emitter.

12. The method of claim 1, wherein the well is a producing well and the method comprises maintaining production during at least one of (a), (b), (c), (d), (e), (f), and (g).

13. A method to locate a feature in a well comprising a wellbore, a coiled tubing string connected to a bottom hole assembly, an annulus positioned in an upper section of the well above the bottom hole assembly, and a lower section of the well positioned between an end of the coiled tubing and a downhole reference, the method comprising:
    (a) deploying the bottom hole assembly to a first location in the well;
    (b) generating a tube wave in the well from a surface wave emitter;
    (c) receiving a reflection of the tube wave from the bottom hole assembly;
    (d) determining a depth of the bottom hole assembly based on a time difference between a first time in which the tube wave is generated and a second time at which the reflection is received;
    (e) analyzing a sign of the reflection relative to the generation of the tube wave to determine a presence or an absence of the feature adjacent to the bottom hole assembly;
    (f) moving the bottom hole assembly to a second location in the well; and
    (g) after moving the bottom hole assembly, repeating the generation of the tube wave (b), the receiving of the reflection (c), the determination of the depth of the bottom hole assembly (d), and the analyzing of the sign (e).

14. The method of claim 13, further comprising moving the bottom hole assembly in the well to one or more additional locations and repeating the generation of the tube wave (b), the receipt of the reflection (c), and the determination of the depth of the bottom hole assembly (d), at each of the one or more additional locations.

15. The method of claim 13, wherein the surface wave emitter generates the tube wave into the annulus, the coiled tubing string, or a combination thereof.

16. The method of claim 13, wherein the reflection from the bottom hole assembly is received with a surface receiver or a distributed sensor cable, wherein the distributed sensor cable is located in the annulus, in the coiled tubing string, or a combination thereof.

17. The method of claim 13, further comprising:
receiving the reflection from the downhole reference with one or more surface receivers or one or more distributed sensor cables;
wherein the one or more of the surface receivers, if present, are located in the annulus, in the coiled tubing string, or a combination thereof;
wherein the one or more of the distributed sensor cables, if present, are located in the annulus, in the coiled tubing string, or a combination thereof; and
wherein the determination of the depth of the bottom hole assembly is based on respective time differences between a first respective time at which each tube wave of a plurality of tube wave is generated and a second respective time at which each corresponding reflection is received.

18. The method of claim 13, further comprising flowing fluid through the bottom hole assembly to open a check valve to enable fluid communication between the coiled tubing string and the wellbore and to enable passage of the tube wave, the receipt of the reflection, or a combination thereof, between the coiled tubing string and the wellbore.

19. The method of claim 13, further comprising interrogating an interval of the well adjacent to the bottom hole assembly with a pressure wave emitted into the well from the bottom hole assembly to determine spacing of a fracture in the interval relative to the bottom hole assembly, wherein the depth of the fracture is determined based on the interrogation of the interval of the well with the pressure wave.

20. The method of claim 19, wherein the interrogation of the interval of the well with the pressure wave comprises transmitting the pressure wave from a surface through the coiled tubing string to the bottom hole assembly.

21. The method of claim 19, further comprising receiving an additional reflection of the interrogation of the well with the pressure wave from the fracture at a downhole receiver mounted at an outer surface or an inner surface of the coiled tubing, wherein the downhole receiver is moveable in tandem with the bottom hole assembly.

22. The method of claim 21, further comprising moving the bottom hole assembly in the well and repeating the interrogation of the well with the pressure wave at one or more additional locations in the well.

23. A system to determine a depth of a bottom hole assembly in a well, comprising:
(a) a coiled tubing string extending from a surface, wherein the coiled tubing string is connected to the bottom hole assembly;
(b) a wave generator located at or near the surface, wherein the wave generator is configured to generate a tube wave in the well;
(c) at least one coiled tubing receiver located in the coiled tubing string, wherein the at least one coiled tubing receiver is configured to receive a reflection of the tube wave, and wherein each of the at least one coiled tubing receiver is selected from a surface receiver, a distributed sensor cable, or a combination thereof;
(d) at least one annulus receiver located in an annulus between a wellbore and the coiled tubing string, wherein the at least one annulus receiver is configured to receive the reflection of the tube wave, and wherein the at least one annulus receiver is selected from a surface receiver, a distributed sensor cable, or a combination thereof;
(e) a recorder configured to determine the depth of a bottom hole assembly based on an elapsed time between a first time at which the tube wave is generated and a second time at which the reflection is received, wherein the recorder is configured to analyze the depth and a sign of the receipt of the reflection relative to the tube wave to determine a presence or an absence of a wellbore feature adjacent to the wave generator.

24. The system of claim 23, wherein the wave generator is located in the coiled tubing, the annulus, or a combination thereof.

25. The system of claim 23, further comprising a plurality of surface receivers located in the annulus and the coiled tubing string.

26. The system of claim 23, further comprising a microprocessor configured to calculate the depth of the bottom hole assembly based on one or more of the elapsed times.

27. The system of claim 23, further comprising:
an emitter in the bottom hole assembly, wherein the emitter is configured to emit a plurality of pressure waves in the well;
a downhole receiver positioned at a fixed distance relative to the emitter and configured to sense respective responses to the plurality of emitted pressure waves; and
an additional recorder configured to track respective elapsed time between the plurality of emitted pressure waves and the respective responses at the downhole receiver.

* * * * *